United States Patent [19]

Nozaki et al.

[11] Patent Number: 5,459,113
[45] Date of Patent: Oct. 17, 1995

[54] ALUMINUM NITRIDE POWDER CAPABLE OF FORMING COLORED SINTERED BODY AND PROCESS FOR PREPARING SAME

[75] Inventors: Toshio Nozaki; Seigo Ohiwa, both of Nagoya; Hiroshi Iwase, Fuji; Masanori Oguni, Shimizu, all of Japan

[73] Assignee: Sumitomo Metal Ceramics Inc., Mine, Japan

[21] Appl. No.: 189,767

[22] Filed: Feb. 1, 1994

[30] Foreign Application Priority Data

Feb. 1, 1993 [JP] Japan ..................... 5-034013

[51] Int. Cl.$^6$ ..................... C04B 35/581
[52] U.S. Cl. ..................... 501/96; 501/153; 423/412
[58] Field of Search ..................... 501/96, 98, 99, 501/153; 264/65, 66; 423/412

[56] References Cited

U.S. PATENT DOCUMENTS

| | | | |
|---|---|---|---|
| 4,578,365 | 3/1986 | Huseby et al. | 501/98 |
| 4,843,038 | 6/1989 | Kuratani et al. | 501/98 |
| 4,877,760 | 10/1989 | Okuno et al. | 501/98 |
| 5,049,367 | 9/1991 | Nakano et al. | 501/96 |
| 5,110,575 | 5/1992 | Wakimura et al. | 501/96 |
| 5,154,863 | 10/1992 | Miyahara | 264/65 |
| 5,294,388 | 3/1994 | Shimoda et al. | 264/65 |
| 5,306,679 | 4/1994 | Shimoda et al. | 501/98 |

FOREIGN PATENT DOCUMENTS 62-191407  8/1987  Japan.
63-233079  9/1988  Japan.
2-120214   5/1990  Japan.

*Primary Examiner*—Mark L. Bell
*Assistant Examiner*—Michael Marcheschi
*Attorney, Agent, or Firm*—Burns, Doane, Swecker & Mathis

[57] ABSTRACT

A sinterable aluminum nitride powder composition is prepared by adding about 0.05–10.0 parts by weight of at least one compound selected from the group consisting of calcium tungstate and calcium molybdate and optionally about 1.0–7.0 parts by weight of at least one compound selected from the group consisting of yttria, calcium oxide, and calcium carbonate to 100 parts by weight of an aluminum nitride powder prepared by the alumina reduction method without decarbonization and having a residual carbon content of about 2%–10% by weight. The resulting powdery composition is subjected to mixing and deagglomeration in a dry process so as to form a powder mixture having a bulk density of about 0.3–0.5 g/cm$^3$, and then to decarbonization by heating in an oxidizing atmosphere. The aluminum nitride powder composition has a pressurized bulk density of about 1.50–1.75 g/cm$^3$ as measured at a pressure of 500 kg/cm$^2$ and an average particle diameter of about 1.0–3.0 μm in which particles having a diameter of 5 μm or larger comprise not greater than about 10% by weight of the powder composition. It is capable of forming a colored sintered body with little or no unevenness of color and sintering, and is also capable of forming green sheets which can be used in the manufacture of a multilayered substrate by the green sheet laminating technology with a minimized tendency toward delamination during sintering.

6 Claims, No Drawings

[5,459,113]

ALUMINUM NITRIDE POWDER CAPABLE OF FORMING COLORED SINTERED BODY AND PROCESS FOR PREPARING SAME

BACKGROUND OF THE INVENTION

The present invention relates to an aluminum nitride (AlN) powder suitable for use in the formation of green sheets which provide, after sintering, colored aluminum nitride sintered bodies useful as ceramic insulating substrates having good thermal conductivity and light shielding properties. The green sheets are particularly useful in the manufacture of multilayered ceramic substrates by the green sheet laminating technology. They are also useful as substrates for hybrid IC's. The present invention is also concerned with a process for preparing such an aluminum nitride powder.

Ceramic insulating substrates are usually produced by preparing a slurry containing a ceramic powder, an organic binder, and optionally one or more additives including a sintering additive, a dispersant, and a colorant, casting the slurry, e.g., by use of a doctor blade, to form a ceramic green sheet, and heating to sinter the green sheet to form a sintered ceramic body. Before or after sintering, an electrically conductive pattern is formed on the sheet by printing using a conductive paste.

Multilayered substrates are produced either by the green sheet laminating technology or by the green sheet printing technology. In the green sheet laminating technology, a plurality of ceramic green sheets prepared in the above manner and each having a printed conductive pattern formed thereon and, if necessary, through holes normally filled with a conductive material, are laminated. In the green sheet printing technology, a plurality of conductive layers and ceramic layers are formed alternately on a ceramic green sheet by printing with a conductive paste and a ceramic paste, respectively. In either method, the resulting multilayered structure is then sintered to produce a multilayered substrate having a multilayered interconnection of a conductor therein.

As the integration density of LSI's increases, it is important to quickly release the heat generated by the operation of LSI's. As a result, in place of conventional alumina substrates, aluminum nitride substrates have attracted increasing attention, since sintered aluminum nitride has a thermal conductivity much higher than sintered alumina and good high-temperature strength and electrical insulating properties.

There are two well-known methods for preparing aluminum nitride powder, which is used as a starting powder (sintering powder) in the production of sintered aluminum nitride. One is the direct nitriding method in which metallic aluminum powder is reacted with nitrogen or ammonia gas. The other is the alumina reduction method in which a mixture of alumina and carbon is reacted with nitrogen or ammonia gas to effect reduction of alumina and nitriding simultaneously.

The direct nitriding method gives a relatively coarse aluminum nitride powder, which must be finely divided by pulverization for a long period before use as a sintering powder. Such pulverization is inevitably accompanied by incorporation of impurities up to the order of a few percent and distortion of crystals. Therefore, it is very difficult in the direct nitriding method to obtain an aluminum nitride sintering powder of high purity having good physical properties including thermal conductivity and good stability in the presence of oxygen.

In contrast, the alumina reduction method provides a fine aluminum nitride powder which can be used as a sintering powder without further pulverization. Accordingly, the sintering powder is highly pure and has good physical properties. However, the aluminum nitride powder prepared by the alumina reduction method contains residual carbon, since carbon is used in excess. The residual carbon must be removed by burning (oxidative heat treatment in an oxidizing atmosphere such as air) before the aluminum nitride powder is used.

In order to accelerate the oxidative removal of carbon or decarbonization of an aluminum nitride powder prepared by the alumina reduction method, it is known to use an oxidation catalyst. Japanese Patent Application Kokai No. 62-191407 (1987) discloses that an oxidation catalyst selected from carbonates, nitrates, and oxides of alkali metals, alkaline earth metals, and rare earth metals is added to a carbon-containing aluminum nitride powder, and the mixture is heated in air at a temperature below 600° C. to selectively remove carbon. It is proposed in Japanese Patent Application Kokai No. 2-120214 (1990) that a mixture of a carbon-containing aluminum nitride and at least one alkaline earth metal or rare earth metal compound be heated at a temperature of 650°–900° C. for 10 minutes to 6 hours in the presence of oxygen to obtain a decarbonized aluminum nitride powder.

In order to protect IC memories formed within substrates from light, particularly UV light and prevent them from showing unevenness of sintering and color, there is a need for colored aluminum nitride sintered bodies.

Japanese Patent Application Kokai No. 63-233079 (1988) describes a method for preparing such a colored aluminum nitride sintered body. In this method, calcium tungstate and/or calcium molybdate which serves as a color-developing agent is added to an aluminum nitride powder, and the resulting mixture is shaped and heated in a non-oxidizing atmosphere to yield a black-colored, light-shielding aluminum nitride sintered body.

It was confirmed that the colored aluminum nitride sintered body prepared by the above method has a decreased tendency toward unevenness of sintering and color and an increased yield of the product compared to a conventional, light-permeating sintered aluminum nitride. The presence of calcium tungstate and/or molybdate in the resulting colored sintered body is expected to have an additional effect of increasing the affinity of the sintered body for a conductive paste which usually contains tungsten or molybdenum powder as a conductive material, thereby facilitating the fixing of a conductive pattern on a substrate formed by the sintered body.

When the above-described method is employed in the production of a multilayered substrate by the green sheet laminating technology, there is a problem that delamination is often encountered during sintering of the laminated green sheets due to a failure of close contact between the green sheets and the printed conductive pattern.

Such delamination can be prevented by reducing the mixing period for preparing a slurry used to cast into green sheets, but this fails to form a uniform slurry, thereby interfering with uniform sintering and resulting in the formation of a sintered body having unevenness of color and sintering.

SUMMARY OF THE INVENTION

It is an object of the present invention to provide an aluminum nitride powder for use in the formation of green sheets which are capable of forming colored aluminum nitride sintered bodies having good thermal conductivity and light shielding properties and having little or no unevenness of color and sintering.

It is another object of the present invention to provide such an aluminum nitride powder which contains calcium tungstate and/or molybdate as a color-developing agent and which does not suffer from the above-described problem of delamination during sintering in the production of a ceramic multilayered substrate by the green sheet laminating technology.

A further object of the present invention is to provide a process for the preparation of such an aluminum nitride powder.

According to the present invention, these and other objects can be accomplished by a sinterable aluminum nitride powder composition suitable for use in the formation of green sheets. The aluminum nitride powder composition comprises aluminum nitride and at least one compound as a color-developing agent selected from the group consisting of calcium tungstate and calcium molybdate in an amount of about 0.05% –10.0% by weight based on the total weight of the composition. The powder composition has a pressurized bulk density of about 1.50–1.75 g/cm$^3$ as measured at a pressure of 500 kg/cm$^2$ and an average particle diameter of about 1.0–3.0 μm in which particles having a diameter of 5 μm or larger comprise not greater than about 10% by weight of the powder composition.

The aluminum nitride powder composition is capable of forming a colored sintered body with little or no unevenness of color and sintering. It is also capable of forming green sheets which can be used in the manufacture of a multilayered substrate (having a multilayered interconnection of a conductor) by the green sheet laminating technology with a minimized tendency toward delamination during sintering.

In a preferred embodiment, the aluminum nitride powder composition further comprises at least one compound as a sintering additive selected from the group consisting of rare earth metal oxides (including yttria), alkaline earth metal oxides, and precursors of these in an amount of about 1.0% –7.0% by weight as a metal oxide based on the total weight of the composition. Such an aluminum nitride powder composition has improved sinterability and can form a colored sintered body having improved sintering uniformity.

In another preferred embodiment, in order to assure the formation of a sintered body with a high thermal conductivity, the aluminum nitride powder composition contains 0.6% –1.1% by weight of oxygen excluding the amount of oxygen present in the above compound or compounds as a color-developing agent and/or a sintering additive, and it has a carbon content of not greater than about 0.05% by weight and a content of inevitable metallic impurites of not greater than about 0.04% by weight.

In another aspect, the present invention provides a process for preparing an aluminum nitride powder composition suitable for use in the formation of green sheets, which comprises the steps of preparing a powdery composition by adding about 0.05–10.0 parts by weight of at least one compound selected from the group consisting of calcium tungstate and calcium molybdate and optionally about 1.0–7.0 parts by weight (as a metal oxide) of at least one compound selected from the group consisting of rare earth metal oxides (including yttria), alkaline earth metal oxides, and precursors thereof to 100 parts by weight of an aluminum nitride powder prepared by the alumina reduction method and having a residual carbon content of about 2% –10.0% by weight, subjecting the powdery composition to mixing and deagglomeration in a dry process so as to form a powder mixture having a bulk density of about 0.3–0.5 g/cm$^3$, and heating the powder mixture in an oxidizing atmosphere for decarbonization.

In a preferred embodiment of the process, the carbon-containing aluminum nitride powder used as a starting material has an oxygen content of not greater than about 1.1% by weight and a content of inevitable metallic impurities of not greater than about 0.04% by weight, and the heating for decarbonization is performed until the carbon content is decreased to about 0.05% by weight or lower.

DETAILED DESCRIPTION OF THE INVENTION

The present inventors investigated the reasons for the above-described delamination and found that the mixing of an aluminum nitride powder with various additives to obtain a uniform slurry to be cast into a green sheet not only results in an increase in oxygen and other impurity contents, thereby deteriorating the sinterability of the aluminum nitride powder, but also causes the resulting green sheet to have an increased green density. The increased green density makes it difficult to compress or reduce the thickness of the green sheet when pressure is applied thereon for lamination. As a result, in the production of a multilayered substrate by laminating a plurality of green sheets each having a printed circuit pattern thereon, it is difficult to completely cover the printed patterns with the surrounding green sheets by the compression of the green sheets, thereby leaving voids between the green sheets and the printed patterns. These voids cause delamination during the subsequent sintering step.

As described above, such delamination can be prevented by reducing the mixing period in the preparation of a slurry, but this undesirably results in the formation of a sintered body having unevenness of color and sintering.

It has been found that addition of either a color-developing agent (calcium tungstate and/or molybdate) or a sintering additive (a rare earth metal oxide, an alkaline earth metal oxide, and/or a precursor thereof) or preferably both of these to an aluminum nitride powder prepared by the alumina reduction method prior to a decarbonization step, rather than to a decarbonized aluminum nitride powder as in a conventional manner, followed by oxidative heat treatment for decarbonization makes it possible to provide an aluminum nitride powder composition having a decreased pressurized bulk density. The aluminum nitride powder composition obtained in this manner can form a green sheet having a decreased green density and an increased reduction in thickness when pressure is applied thereto. As a result, delamination is minimized in the production of a multilayered substrate.

Although it is not certain, the formation of a green sheet having a decreased green density and an increased reduction in thickness under pressure is thought to be attributable to the fact that the aluminum nitride powder composition has an effect of retarding the deagglomeration of the aluminum nitride powder during mixing which is conducted to form a uniform slurry used to cast into a green sheet. Therefore, it is possible to form a slurry in which aluminum nitride is not completely deagglomerated into primary particles, and hence it is possible to form a green sheet in which the aluminum nitride powder is packed less tightly to give a decreased green density. When pressure is applied to the green sheet, the remaining agglomeration of the aluminum nitride powder is readily broken by the pressure to cause the powder to pack tightly, thereby creating an increased reduction in thickness. Therefore, in the production of a multilayered substrate by laminating a plurality of green sheets each having a printed pattern formed thereon followed by sintering, it is possible to cover the printed patterns with the surrounding green sheets completely and tightly during lamination so as to assure close contact between the printed patterns and green sheets and avoid delamination during sintering.

In contrast, in a conventional green sheet, a slurry is formed by mixing an aluminum nitride powder with a color-developing agent and a sintering additive. In such cases, deagglomeration of the aluminum nitride powder tends to occur completely during the mixing, thereby forming a green sheet in which the aluminum nitride powder is packed tightly to give a high green density, and such a green sheet is difficult to reduce the thickness when pressure is applied thereto.

The sinterable aluminum nitride powder composition according to the present invention is suitable for use in the formation of green sheets, which can form colored sintered bodies having improved evenness of color and sintering and can be used in the manufacture of a multilayered substrate by the green sheet laminating technology with a minimized tendency toward delamination during sintering.

The sinterable aluminum nitride powder composition comprises aluminum nitride and at least one compound as a color-developing agent selected from the group consisting of calcium tungstate ($CaWO_4$, $Ca_3WO_6$) and calcium molybdate ($CaMoO_4$, $Ca_3MoO_6$) in an amount of about 0.05–10.0%, preferably about 0.1–8.0%, and more preferably 0.5–5.0% by weight based on the total weight of the composition. The calcium tungstate or calcium molybdate may be used in the form of a stoichiometric mixture of calcium oxide and tungsten oxide or molybdenum oxide. The color-developing agent in an amount of less than about 0.05% does not have a color-developing effect sufficient to provide a light-shielding sintered body. The presence of the color-developing agent in an amount of greater than about 10.0% causes the formation of a sintered body having a decreased thermal conductivity and does not provide a further increase in color-developing effect.

The sinterable aluminum nitride powder composition has a pressurized bulk density of about 1.50–1.75 g/cm$^3$ and preferably about 1.55–1.70 g/cm$^3$ as measured at a pressure of 500 kg/cm$^2$. The average particle diameter of the powder composition is within the range of about 1.0–3.0 μm and preferably about 1.5–2.5 μm in which particles having a diameter of 5 μm or larger comprise not greater than about 10% and preferably not greater than 5% by weight of the powder composition. The term "particle diameter" herein means the particle diameter of a primary particle which is in a non-agglomerated state.

When the pressurized bulk density is less than about 1.50 g/cm$^3$ or the average particle diameter is greater than about 3.0 μm, a green sheet formed from the powder composition has a green density which is too low to obtain a sintered body having a sufficient density and strength after sintering. On the other hand, a pressurized bulk density of higher than about 1.75 g/cm$^3$ or an average particle diameter of less than about 1.0 μm tends to cause unevenness of sintering or warpage during sintering.

The pressurized bulk density and particle size of the aluminum nitride powder composition are important factors in forming a green sheet having a decreased green density and an increased reduction in thickness under pressure, thereby minimizing delamination in the production of a multilayered substrate. As described below, delamination can be effectively prevented when each green sheet to be laminated has a reduction in thickness of about 8% or greater as determined by the prescribed testing method. By satisfying the above-described requirements for pressurized bulk density, average particle size, and size distribution, it is assured that the aluminum nitride powder composition of the present invention has a reduction in thickness of about 8% or greater.

It is well known that the thermal conductivity of an aluminum nitride sintered body depends on the impurity level. In order to ensure the formation of a sintered body having a satisfactory level of thermal conductivity (about 125 W/mK or higher) and good uniformity and strength after sintering, it is preferable that the aluminum nitride powder composition have an oxygen content of about 0.6%–1.1%, a carbon content of not greater than about 0.05%, and a content of inevitable metallic impurities of not greater than about 0.4% by weight.

An oxygen content of less than about 0.6% by weight interferes with the sinterability of the aluminum nitride powder composition and tends to form a sintered body having insufficient strength, while an oxygen content of greater than about 1.1% by weight decreases the thermal conductivity of a sintered body produced from the powder composition. The oxygen content is more preferably in the range of about 0.7%–0.9% by weight. The oxygen content herein means the amount of oxygen from which the amount of oxygen contained in the oxygen-containing compound added as a color-developing agent and/or a sintering additive is excluded.

The presence of carbon in excess of about 0.05% by weight or inevitable metallic impurities in excess of about 0.04% by weight in the powder composition decreases the thermal conductivity of a sintered body. More preferably, the carbon content is in the range of about 0.01%–0.03% by weight and the content of inevitable metallic impurities is not greater than about 0.01% by weight from a practical viewpoint.

Preferably, the aluminum nitride powder composition of the present invention contains, in combination with the color-developing agent, at least one compound as a sintering additive in an amount of about 1.0%–7.0% by weight as a metal oxide based on the total weight of the composition. Such an aluminum nitride powder composition can be slurried for the formation of green sheets with no need of addition of any inorganic powdery additive such as a sintering additive or color-developing agent which requires a mechanical mixing procedure. Therefore, a slurry can be prepared by merely dispersing the powder composition in an organic solvent which contains an organic binder and other additives. As a result, not only the procedure to form a slurry is simplified, but also the uniformity of the slurry and hence the green sheets and sintered bodies prepared therefrom is improved.

The sintering additive is selected from the group consisting of rare earth metal oxides including yttrium oxide (yttria), alkaline earth metal oxides, and precursors of these. Examples of useful rare earth metal oxides include yttria, holmium oxide, dysprosium oxide, and neodymium oxide and examples of useful alkaline earth metal oxides include calcium oxide and barium oxide. Precursors of these oxides which can be converted into an oxide by heating during sintering may also be used as a sintering additive. Examples of such precursors include carbonates and hydroxides of rare earth metals and alkaline earth metals such as yttrium carbonate, calcium carbonate, calcium hydroxide, and barium carbonate.

Preferably, the sintering additive, when present in the powder composition, is selected from yttria, calcium oxide, and precursors of these such as calcium carbonate. More preferably, the sintering additive is either yttria alone or a combination of yttria with calcium oxide or calcium carbonate. When the amount of the sintering additive is less than about 1.0% by weight as a metal oxide, the above effect cannot be attained sufficiently. The presence of the sintering additive in an amount of greater than about 7.0% by weight as a metal oxide does not produce further improvement in the above-described effect. The amount of the sintering additive, when present, is more preferably in the range of about 2%–6% by weight as a metal oxide.

The sinterable aluminum nitride powder composition of the present invention can be prepared from an aluminum nitride powder (starting aluminum nitride powder) obtained by the alumina reduction method which has a residual carbon content of about 2%–10% and preferably about 3%–7% by weight. It is also preferred that the starting aluminum nitride powder have an oxygen content of not greater than about 1.1% and more preferably not greater than about 0.9% by weight and a content of inevitable metallic impurities of not greater than about 0.04% and preferably not greater than about 0.01% by weight for the reasons described above.

Preferably, the reduction of alumina to form a starting aluminum nitride powder is performed with a carbonaceous material as a reducing agent which can be readily burnt out in the decarbonization stage. Examples of suitable carbonaceous materials are particulate carbons such carbon black and activated carbon as well as various organic compounds, particularly organic resins such as a phenol-formaldehyde resin, polyphenylene oxide resin, and polystyrene resin. The use of graphite as a reducing agent is not preferable since it is difficult to burn out in the decarbonization stage.

When the starting aluminum nitride powder prepared by the alumina reduction method has a residual carbon content of less than about 2% by weight, there is a possibility that unreacted alumina still remains in an appreciable amount in the resulting aluminum nitride powder. On the other hand, a residual carbon content of greater than about 10% requires the subsequent step of decarbonization (oxidative heat treatment) to be performed for a prolonged period, thereby resulting in an increase in the oxygen content during the decarbonization.

The average particle diameter of the starting aluminum nitride powder may be slightly larger than that desired for the aluminum nitride powder composition obtained after decarbonization since a slight reduction in particle size may occur in the subsequent mixing and deagglomeration step.

To 100 parts by weight of a carbon-containing starting aluminum nitride powder, calcium tungstate and/or calcium molybdate which serves as a color-developing agent is added in a powder form in a total amount of about 0.5–10.0 parts by weight to give a powdery composition. As described previously, the color-developing agent may be in the form of a stoichiometric mixture of calcium oxide with tungsten and/or molybdenum oxide. Preferably, one or more sintering additives selected from rare earth metal oxides, alkaline earth metal oxides, and precursors of these are added in a powder form in combination with the color-developing agent. The total amount added of such sintering additives is in the range of about 1.0–7.0 parts by weight as metal oxides.

If these additives are added in an earlier stage, i.e., prior to or during the preparation of a starting aluminum nitride powder by the alumina reduction method, they will be thermally decomposed at least partly at the high reaction temperature required for reduction and nitriding of alumina.

It is preferable that the color-developing agent have a purity of at least about 98% by weight, a moisture content of not greater than about 1% by weight, and an average particle diameter of not larger than 10 μm and that the sintering additive have a purity of at least about 98% and more preferably 99.9% by weight or higher and an average particle diameter of not larger than 5 μm. Since these additives have a hardness much lower than that of aluminum nitride, they undergo a considerable size reduction in the subsequent mixing and deagglomeration step.

The resulting powdery composition is subjected to mixing and deagglomeration in a dry process so as to give a powder mixture having a bulk density in the range of about 0.3–0.5 g/cm$^3$ and preferably about 0.35–0.45 g/cm$^3$. By performing the mixing and deagglomeration so as to give a powder mixture having a bulk density in the above-described range, it is possible to deagglomerate the starting aluminum nitride powder completely and reduce the size of the additives sufficiently while uniformly mixing the powder materials. Furthermore, when the resulting uniform powder mixture is heated in an oxidizing atmosphere for decarbonization in the subsequent step, it is possible to form an aluminum nitride powder composition having a pressurized bulk density in the desired range (about 1.50–1.75 g/cm$^3$). When the powder mixture has a bulk density of less than 0.3 g/cm$^3$, it is difficult to form a green sheet having a green density high enough to maintain its strength. A bulk density of the powder mixture in excess of 0.5 g/cm$^3$ results in the formation of a green sheet having an undesirably increased green density and a decreased reduction in thickness under pressure, thereby increasing the possibility of delamination in the production of a multilayered substrate.

The mixing and deagglomeration in a dry process can be conducted in an appropriate mixer or mill, such as a vibration ball mill or tumbling ball mill for from about 30 minutes to about 20 hours and preferably from about 1 hour to about 10 hours.

The powder mixture is then decarbonized by heating in an oxidizing atmosphere such as air, thereby providing the desired aluminum nitride powder composition of the present invention. The heating conditions for decarbonization greatly depend on the residual carbon content of the starting aluminum nitride powder and are preferably selected such that the carbon content is decreased to about 0.05% by weight or less without appreciably increasing the oxygen content. Usually, the powder mixture is heated for about 1–20 hours in dry air at about 500°–800° C. using a continuous or batch-type furnace or kiln. Preferable heating conditions are about 5–10 hours at about 500°–600° C.

The resulting aluminum nitride powder composition contains calcium tungstate and/or molybdate as a color-developing agent and optionally one or more sintering additives in particular amounts, and it has a particular pressurized bulk density and average particle size. The powder composition is capable of forming a colored aluminum nitride sintered body by forming a green sheet from the powder composition followed by sintering. The powder composition is particularly suitable for use in the production of a colored aluminum nitride multilayered substrate.

A green sheet can be prepared in a conventional manner. For example, 100 parts by weight of an aluminum nitride powder composition of the present invention are mixed with about 7–15 parts by weight of a binder and about 50–70 parts by weight of an organic solvent. If desired, one or more of about 1–5 parts by weight of a sintering additive, about 1–5 parts by weight of a dispersant, and 1–20 parts by weight of a plasticizer may be added.

Useful binders include a polyvinylbutyral resin and acrylic acid resin. The organic solvent may be selected from an alcohol such as ethanol, hydrocarbons such as toluene, ketones such as methyl ethyl ketone, ethers, esters, and the like. A mixture of two or more organic solvents may be used. When the aluminum nitride powder composition does not contain a sintering additive, one or more sintering additives such as those selected from rare earth metal oxides, e.g., yttria, and alkaline earth metal oxides, e.g., calcium oxide, and precursors of these may be added. Useful dispersants include sardine oil and higher fatty acids, and useful plasticizers include dibutyl phthalate and dioctyl phthalate.

The wet mixing is preferably performed in a mill made of or coated with a resin, e.g., a nylon pot mill, for a period of from about 1–20 hours until a uniform slurry is formed. When the aluminum nitride powder composition contains a sintering additive, a slurry can be formed without addition of any powdery inorganic additive such as a sintering additive or a color-developing agent to the aluminum nitride powder composition. Therefore, in such cases a uniform slurry can be obtained by mixing for an extremely short period, such as on the order of about 1–10 hours.

The slurry is then usually stirred at a reduced pressure for about 10 minutes to about 5 hours to evaporate part of the solvent and adjust the viscosity to a level suitable for casting and to remove bubbles (deaerate). Thereafter, the slurry is cast into a continuous green sheet having a predetermined thickness by use of a doctor blade, for example, and then cut into a desired length.

In the production of a multilayered substrate, a plurality of green sheets are punched to form through holes and then printed with a conductive paste to form a conductive circuit pattern on each green sheet and the through holes are filled with a conductive paste. The green sheets are then laminated under pressure to form a unitary laminate body. The laminate may be degreased by heating at about 700°–800° C. in a nitrogen or other non-oxidizing gas atmosphere before it is finally sintered in a non-oxidizing atmosphere. The sintering may preferably be conducted in a sintering furnace for about 2–10 hours at about 1600°–1900° C. in a nitrogen atmosphere.

Due to the black color, the resulting colored sintered body or multilayered substrate has little or no unevenness of sintering and color and has a light shielding effect which is able to protect the IC memories or other electronic devices within the multilayered substrate.

In a conventional method for the production of a multilayered substrate in which a decarbonized aluminum nitride powder is mixed with a color-developing agent and a sintering additive both in powder form to prepare a slurry for casting into green sheets, delamination is often encountered during sintering.

Such delamination is effectively minimized when an aluminum nitride powder composition of the present invention is used to prepare a slurry. The present inventors have found empirically that delamination is minimized when the green sheets to be laminated have a reduction in thickness of at least about 8% and preferably in the range of about 10%–15% when a pressure is applied during laminating.

In the above-described conventional method, green sheets are formed from a slurry prepared by mixing an aluminum nitride powder with a color-developing agent and a sintering additive and they have a general tendency to have a reduction in thickness which is as low as about 6% or less and fluctuates significantly. Such green sheets have a relatively high green density since the aluminum nitride powder tends to be completely deagglomerated during mixing.

As described previously, green sheets prepared from the aluminum nitride powder composition of the present invention generally have a decreased green density probably due to the fact that deagglomeration of the aluminum nitride powder is retarded. As a result, the green sheets have an increased reduction in thickness of at least about 8% and preferably in the range of about 10%–15%, which is effective for prevention of delamination.

The reduction in thickness of a green sheet can be determined by the following testing method, in which all parts are by weight.

A slurry is prepared by mixing 100 parts of an aluminum nitride powder with 11 parts of a polyvinylbutyral resin as a binder, 60 parts of a mixed solvent of n-butyl alcohol, methyl ethyl ketone, and ethyl alcohol (1:1:1 by volume), 2 parts of dibutyl phthalate as a plasticizer, and 2 parts of a sardine oil as a dispersant for 8 hours in a nylon pot mill. A color-developing agent and/or a sintering additive may be added to the aluminum nitride powder, depending on the composition to be tested. After the slurry is stirred for 1 hour at a reduced pressure to adjust the viscosity and deaerate, it is cast into a 1 mm-thick green sheet by the doctor blade method. The green sheet is allowed to stand for 24 hours at room temperature and then a test specimen measuring 50 mm×50 mm is cut from the green sheet.

The initial thickness of the test specimen ($H_0$) is measured with a thickness gauge. Subsequently, a pressure plate having the same shape as the test specimen is placed on the specimen and a pressure of 70 kg/cm$^2$ is applied for 20 seconds at 100° C. through the pressure plate. Immediately thereafter, the thickness after application of pressure ($H_1$) is measured. The reduction in thickness ($\Delta H$) is calculated by the following equation:

$$\Delta H(\%) = (H_0 H_2)/H_0 \times 100$$

The aluminum nitride powder composition according to the present invention has a reduction in thickness of at least about 8% and in most cases in the range of about 10%–15% as determined above. As a result, it can be used in the production of a multilayered substrate with a minimized tendency toward delamination. Furthermore, the presence of calcium tungstate and/or molybdate makes it possible to produce a colored sintered body which is free from unevenness in sintering and color and which has good light-shielding properties, without adversely affecting the thermal conductivity of the sintered body. Therefore, the sintered body has a desirable thermal conductivity of at least 125 W/mK.

When the aluminum nitride powder composition contains a sintering additive in addition to the above compound as a color-developing agent, it is possible to form a uniform slurry for casting into a green sheet with an extremely short mixing period. Therefore, not only is the uniformity of the resulting sintered body improved, but also an increase in oxygen content during mixing can be prevented. The productivity and production costs to produce an aluminum nitride sintered body are also improved.

The following examples are presented to further illustrate the present invention. These examples are to be considered in all respects as illustrative and not restrictive. All the parts and percents are by weight unless otherwise indicated. In the examples, various factors were determined in the following manner.

Oxygen content was determined by the activation analysis method, metallic impurity content was determined by the fluorescent X-ray analysis method to be the sum of (%Fe+ %Si+%Ca), and carbon content was determined by the burning method.

Average particle diameter was determined by use of a Sedigraph (5000 E sold by Shimadzu-Micrometric).

Pressurized bulk density was determined by packing a cylindrical mold having an inner diameter of 40 mm and a height of 20 mm with 15 g of an aluminum nitride powder composition followed by application of a pressure of 500 kg/cm$^2$. The volume under pressure was determined and a bulk density was calculated from the pressurized volume.

Bulk density (non-pressurized) was determined by use of a powder tester sold by Hosokawa Tekkosho K. K.

The reduction in thickness of a green sheet under pressure was determined generally in accordance with the above-described manner, but the mixing period to form a slurry was varied in some examples as shown in Table 2.

The presence (X) or absence (O) of delamination and unevenness of sintering and color of a sintered multilayered substrate were evaluated by visual observation.

The density of a sintered multilayered substrate was determined by the Archimedes method, and the thermal conductivity thereof was determined by the laser flash method.

EXAMPLES

EXAMPLE 1

An aluminum nitride powder which was prepared by the alumina reduction method using carbon black as a reducing agent and which had not been decarbonized was used as a starting powder in this example. The starting aluminum nitride (AlN) powder had an oxygen content of 0.5%, an incidental impurity content of 0.024%, and a residual carbon content of 5%, and its average particle diameter was 2.5 µm.

To a vibration ball mill employing alumina balls, 100 parts of the starting aluminum nitride powder and 2 parts of calcium tungstate (99.5% purity, average particle diameter 4 µm, sold by Wako Jun-yaku) were added and subjected to mixing and deagglomeration in a dry process for 3 hours in the ball mill, resulting in the formation of a powder mixture having a bulk density of 0.42 g/cm$^3$.

The powder mixture was heated in air for 7 hours using a heating furnace at 600° C. for decarbonization. The resulting decarbonized aluminum nitride powder composition contained 2.1% of calcium tungstate and 0.6% of oxygen excluding the amount of oxygen contained in the calcium tungstate. It had an inevitable metallic impurity content of 0.024%, a carbon content of 0.02%, and an average particle diameter of 1.9 µm. The proportion of particles larger than 5 µm was 2% of the composition. The aluminum nitride powder composition had a pressurized bulk density of 1.63 g/cm$^3$ and a reduction in thickness of 10.6%.

Table 1 shows the impurity level of the starting aluminum nitride powder, amounts of the additives, and bulk density of the powder mixture obtained by mixing and deagglomeration before decarbonization, as well as the impurity level, pressurized bulk density, average particle diameter, and proportion of particles larger than 5 µm of the aluminum nitride powder composition.

Using the aluminum nitride powder composition, a green sheet was formed generally in the same manner as described above for the testing method for determining a reduction in thickness. Namely, to a nylon pot mill were added 100 parts of the aluminum nitride powder composition, 3 parts of yttria as a sintering additive, 11 parts of a polyvinylbutyral resin as a binder, 60 parts of a mixed solvent of n-butyl alcohol, methyl ethyl ketone, and ethyl alcohol (1:1:1 by volume), 2 parts of dibutyl phthalate as a plasticizer, and 2 parts of a sardine oil as a dispersant, and mixing was continued for 8 hours to form a uniform slurry. The slurry was stirred for 1 hour at a reduced pressure and then cast into a 1 mm-thick green sheet by the doctor blade method. After the green sheet was allowed to stand for 24 hours at room temperature, the reduction in thickness under pressure was determined by the above-described testing method and was 10.6% as shown in Table 2. Table 2 also indicates the mixing period in the formation of the slurry.

A plurality of green sheets prepared as described above were printed with a metallized paste containing molybdenum or tungsten particles so as to form different circuit patterns thereon. Five of these printed green sheets were laminated under pressure to give a unitary body (laminate). The laminate was heated in a nitrogen atmosphere at 800° C. for degreasing and then finally sintered by heating for 2 hours in a nitrogen atmosphere at 1750° C. The resulting black-colored sintered body (multilayered substrate) was evaluated with respect to delamination, unevenness of color, density, and thermal conductivity. The results are also shown in Table 2.

EXAMPLE 2

Following the procedure described in Example 1 except that 2 parts of calcium molybdate were used in place of the calcium tungstate, an aluminum nitride powder composition and a black sintered, multilayered substrate were prepared. The conditions and the test results are shown in Tables 1 and 2.

EXAMPLES 3–12 AND COMPARATIVE EXAMPLES 1–8

Aluminum nitride powder compositions having different bulk densities were prepared in the same manner as described in Example 1 except that different starting aluminum nitride powders having varying contents of metallic impurities and residual carbon were used along with different amounts or classes of additive or additives. The conditions for mixing and deagglomeration prior to decarbonization were also varied, while the conditions for decarbonization were the same as in Example 1.

In Examples 9 to 12, one or more compounds were added as a sintering additive to the starting aluminum nitride powder so as to prepare aluminum nitride powder compositions which contained a sintering additive. In these examples, the addition of 3 parts of yttria was omitted in the preparation of the slurry to be cast into a green sheet.

Using the resulting powder compositions, sintered aluminum nitride multilayered substrates were prepared in the same manner as described in Example 1 except that the mixing period to form a slurry was varied in some examples. The conditions and test results are also shown in Tables 1 and 2.

It is noted that an aluminum nitride powder composition having a pressurized bulk density of greater than 1.75 g/cm$^3$ suffered delamination (Comparative Example 7).

COMPARATIVE EXAMPLES 9–11

These comparative examples illustrate the preparation of a green sheet in a conventional manner wherein a decarbonized aluminum nitride powder is mixed with a color-developing agent and a sintering additive in the preparation of a slurry.

The aluminum nitride powder used in these examples was a decarbonized aluminum nitride powder which contained 10 ppm of Fe, 20 ppm of Si, 200 pm of Ca, 0.7% of oxygen, and 0.02% of carbon and had a pressurized bulk density of 1.69 g/cm$^3$ and an average particle diameter of 1.7 µm in which particles larger than 5 µm comprised 2%. The decarbonized aluminum nitride powder was used to prepare a green sheet and a sintered multilayered substrate in the same manner as described in Example 1 except that 2 parts of calcium tungstate were also added to the decarbonized aluminum nitride powder and the mixing period to form a slurry was varied as shown in Table 2. The test results are also shown in Table 2.

It is noted that delamination did not occur when the mixing period was relatively short (Comparative Example 9), but the resulting sintered bodies had unevenness of color. When the mixing period was extended so as to eliminate unevenness of color of the sintered body, delamination occurred in the resulting multilayered sintered body (Comparative Examples 10 and 11).

TABLE 1

| | Conditions for Preparing AlN Powder Composition | | | | | | | Properties of AlN Powder Composition | | | | | | | |
|---|---|---|---|---|---|---|---|---|---|---|---|---|---|---|---|
| | Starting AlN Powder | | | | | Bulk | | Impurities | | | | | Pressurized Bulk Density (g/cm$^3$) | Average Particle Diameter (µm) | % Particles larger than 5 µm |
| No. | ppm Fe | ppm Si | ppm Ca | % C | Compound Added Compound | % | density (g/cm$^3$) | ppm Fe | ppm Si | % C | % D | % Ca | | | |
| EXAMPLE | | | | | | | | | | | | | | | |
| 1 | 10 | 20 | 210 | 5 | Ca Tungstate | 2 | 0.42 | 10 | 20 | 0.02 | 0.6 | 0.30 | 1.63 | 1.9 | 2 |
| 2 | 10 | 20 | 210 | 5 | Ca Molybdate | 2 | 0.39 | 10 | 20 | 0.02 | 0.6 | 0.41 | 1.60 | 1.9 | 2 |
| 3 | 10 | 20 | 210 | 5 | Ca Tungstate | 0.1 | 0.38 | 10 | 30 | 0.02 | 0.6 | 0.03 | 1.59 | 1.8 | 2 |
| 4 | 10 | 20 | 210 | 5 | Ca Tungstate | 0.5 | 0.43 | 20 | 30 | 0.02 | 0.7 | 0.09 | 1.64 | 1.6 | 2 |
| 5 | 10 | 20 | 210 | 5 | Ca Tungstate | 8 | 0.45 | 10 | 20 | 0.02 | 0.6 | 1.10 | 1.65 | 1.5 | 2 |
| 6 | 20 | 40 | 150 | 2 | Ca Tungstate | 2 | 0.33 | 20 | 50 | 0.02 | 0.6 | 0.28 | 1.50 | 2.3 | 5 |
| 7 | 20 | 40 | 150 | 5 | Ca Tungstate | 2 | 0.41 | 30 | 60 | 0.02 | 0.7 | 0.30 | 1.61 | 1.7 | 2 |
| 8 | 20 | 40 | 150 | 8 | Ca Tungstate | 2 | 0.47 | 20 | 40 | 0.02 | 0.8 | 0.31 | 1.69 | 1.4 | 2 |
| 9 | 10 | 20 | 210 | 5 | Ca Tungstate Yttria | 2 3 | 0.40 | 10 | 20 | 0.02 | 0.6 | 0.29 | 1.62 | 1.9 | 2 |
| 10 ~ 12 | 10 | 20 | 210 | 5 | Ca Tungstate Yttria Ca Carbonate | 2 1 3 | 0.39 | 10 | 20 | 0.02 | 0.6 | 1.45 | 1.62 | 1.9 | 2 |
| COMPARATIVE EXAMPLE | | | | | | | | | | | | | | | |
| 1 | 20 | 530 | 210 | 4 | Ca Tungstate | 2 | 0.40 | 20 | 550 | 0.02 | 0.6 | 0.30 | 1.62 | 2.0 | 2 |
| 2 | 10 | 20 | 210 | 0.5 | Ca Tungstate | 2 | 0.40 | 20 | 30 | 0.02 | 1.4 | 0.29 | 1.65 | 1.8 | 2 |
| 3 | 10 | 30 | 250 | 15 | Ca Tungstate | 2 | 0.37 | 20 | 40 | 0.02 | 1.3 | 0.34 | 1.56 | 2.2 | 7 |
| 4 | 20 | 40 | 180 | 5 | Ca Tungstate | 0.01 | 0.43 | 30 | 50 | 0.02 | 0.7 | 0.02 | 1.67 | 1.9 | 2 |
| 5 | 20 | 40 | 180 | 5 | Ca Tungstate | 15 | 0.41 | 30 | 60 | 0.02 | 0.7 | 1.90 | 1.64 | 1.9 | 2 |
| 6 | 10 | 20 | 210 | 5 | Ca Tungstate | 2 | 0.23 | 20 | 20 | 0.02 | 0.6 | 0.28 | 1.45 | 3.3 | 15 |
| 7 | 10 | 20 | 210 | 5 | Ca Tungstate | 2 | 0.65 | 20 | 30 | 0.02 | 1.0 | 0.30 | 1.80 | 1.0 | 2 |
| 8 | 10 | 20 | 210 | 5 | Yttria | 3 | 0.40 | 10 | 20 | 0.02 | 0.6 | 0.02 | 1.63 | 1.9 | 2 |

TABLE 2

| No. | Mixing Period (hrs) | Green Sheet % Reduction in Thickness | Multilayered Sintered Body Density (g/cm³) | Evenness of Color | Delamination | Thermal Conductivity (W/mK) |
|---|---|---|---|---|---|---|
| Example | | | | | | |
| 1 | 8 | 10.6 | 3.29 | ○ | ○ | 155 |
| 2 | 8 | 11.2 | 3.80 | ○ | ○ | 150 |
| 3 | 8 | 13.0 | 3.31 | ○ | ○ | 192 |
| 4 | 8 | 11.0 | 3.29 | ○ | ○ | 172 |
| 5 | 8 | 12.3 | 3.30 | ○ | ○ | 125 |
| 6 | 10 | 14.9 | 3.29 | ○ | ○ | 153 |
| 7 | 8 | 11.3 | 3.30 | ○ | ○ | 149 |
| 8 | 4 | 11.7 | 3.30 | ○ | ○ | 151 |
| 9 | 8 | 10.9 | 3.29 | ○ | ○ | 140 |
| 10 | 10 | 9.8 | 3.28 | ○ | ○ | 135 |
| 11 | 6 | 11.0 | 3.27 | ○ | ○ | 135 |
| 12 | 2 | 15.0 | 3.27 | ○ | ○ | 130 |
| Comparative Example | | | | | | |
| 1 | 8 | 10.5 | 3.29 | ○ | ○ | 110 |
| 2 | 8 | 11.2 | 3.33 | ○ | ○ | 96 |
| 3 | 8 | 10.9 | 3.32 | ○ | ○ | 106 |
| 4 | 8 | 9.7 | 3.28 | Note 1 | ○ | 189 |
| 5 | 8 | 10.9 | 3.30 | ○ | ○ | 95 |
| 6 | 8 | 13.5 | 3.03 | X | ○ | 110 |
| 7 | 8 | 5.6 | 3.30 | ○ | X | 150 |
| 8 | 8 | 10.8 | 3.30 | Note 1 | ○ | 135 |
| 9 | 2 | 10.3 | 3.23 | X | ○ | 135 |
| 10 | 8 | 4.7 | 3.29 | ○ | X | 150 |
| 11 | 16 | 2.0 | 3.30 | ○ | X | 153 |

Note 1: Poor in light-shielding properties

It will be appreciated by those skilled in the art that numerous variations and modifications may be made to the invention as described above with respect to specific embodiments without departing from the spirit or scope of the invention as broadly described.

What is claimed is:

1. A process for preparing an aluminum nitride powder composition suitable for use in the formation of green sheets, which comprises the steps of preparing a powdery composition adding about 0.05–10.0 parts by weight of at least one compound as a color-developing agent selected from the group consisting of calcium tungstate and calcium molybdate to 100 parts by weight of an aluminum nitride powder which has been prepared by the alumina reduction method but has not yet been subjected to decarbonization and having a residual carbon content of about 2%–10% by weight, subjecting the powdery composition to mixing and deagglomeration in a dry process so as to form a powder mixture having a bulk density of about 0.3–0.5 g/cm³, and heating the powder mixture in an oxidizing atmosphere for decarbonization.

2. The process of claim 1, wherein said at least one compound as a color-developing agent is added in an amount of about 0.1%–8.0 parts by weight.

3. The process of claim 1, wherein about 1.0–7.0 parts by weight, as a metal oxide, of at least one compound selected from the group consisting of rare earth metal oxides, alkaline earth metal oxides, and precursors of these are also added as a sintering additive in the step of preparing a powdery composition.

4. The process of claim 3, wherein said at least one compound added as a sintering additive is selected from yttria, calcium oxide, and precursors of these and it is added in an amount of about 2–6 parts by weight as a metal oxide.

5. The process of claim 1, wherein said aluminum nitride powder prepared by the alumina reduction method has an oxygen content of not greater than about 1.1% by weight and a content of metallic impurities of not greater than about 0.04% by weight, and said heating is performed until the carbon content is decreased to about 0.05% by weight or lower.

6. The process of claim 3, wherein said aluminum nitride powder prepared by the alumina reduction method has an oxygen content of not greater than about 1.1% by weight and a content of metallic impurities of not greater than about 0.04% by weight, and said heating is performed until the carbon content is decreased to about 0.05% by weight or lower.

* * * * *